(12) United States Patent
Seay

(10) Patent No.: US 7,974,227 B1
(45) Date of Patent: Jul. 5, 2011

(54) RELAYED SIGNAL COMMUNICATIONS

(76) Inventor: Thomas Stanley Seay, Solana Beach, CA (US)

(*) Notice: Subject to any disclaimer, the term of this patent is extended or adjusted under 35 U.S.C. 154(b) by 2234 days.

(21) Appl. No.: 10/725,873

(22) Filed: Dec. 2, 2003

(51) Int. Cl.
| | |
|---|---|
| H04B 7/14 | (2006.01) |
| H04B 7/185 | (2006.01) |
| H04B 3/36 | (2006.01) |
| H04B 7/15 | (2006.01) |
| H04W 4/00 | (2009.01) |

(52) U.S. Cl. ........ 370/315; 370/316; 455/427; 455/430; 455/7; 455/11.1; 455/12.1

(58) Field of Classification Search ............... 455/7–25, 455/12.1, 13.1–13.3, 3.02, 3.03, 427–431, 455/11.1–13.2, 410, 411; 375/211–215, 375/130, 132; 370/315–327, 338; 342/352–354
See application file for complete search history.

(56) References Cited

U.S. PATENT DOCUMENTS

| | | | |
|---|---|---|---|
| 4,901,307 A | 2/1990 | Gilhousen et al. | |
| 5,197,125 A | 3/1993 | Engel et al. | |
| 5,490,087 A * | 2/1996 | Redden et al. ............. | 455/427 |
| 5,563,606 A * | 10/1996 | Wang ........................... | 342/354 |
| 5,638,399 A * | 6/1997 | Schuchman et al. ......... | 370/324 |
| 6,201,967 B1 * | 3/2001 | Goerke ..................... | 455/435.1 |
| 6,324,405 B1 * | 11/2001 | Young et al. .............. | 455/456.1 |
| 6,438,142 B1 * | 8/2002 | Bousquet .................... | 370/498 |
| 2003/0073404 A1 * | 4/2003 | Sauvageot et al. .......... | 455/13.1 |
| 2004/0018834 A1 * | 1/2004 | Talaie et al. ............... | 455/422.1 |
| 2004/0048609 A1 * | 3/2004 | Kosaka ..................... | 455/422.1 |
| 2005/0009522 A1 * | 1/2005 | Bi et al. .................... | 455/435.3 |
| 2005/0032525 A1 * | 2/2005 | Gasbarro .................... | 455/456.1 |

OTHER PUBLICATIONS

Bravman, et al., "Multiple Path Beyond-Line-of-Sight Communications (MUBLCOM)", IEEE MILCOM 1998.
Van Trees, "Optimum Array Processiong", Wiley, 2002, pp. 334-349 and 728-730.
Liberti, et al., "Smart Antennas for Wireless Communications", Prentice-Hall, 1999, pp. 89-91, 95-98, 172-174 and 215-251.
Eken, "Use of Antenna Nulling with Frequency-Hopping Against the Follower Jammer", IEEE Transactions on Antennas and Propagation, vol. 39, No. 9, Sep. 1991, pp. 1391-1397.
Torrieri, et al., "An Anticipative Array for Frequency-Hopping Communications", IEEE Transactions on Aerospace and Electronic Systems, vol. 24, No. 4, Jul. 1988, pp. 449-456.
Viberg, "Sensor Array Processing Using Gated Signals", IEEE Transactions on Acoustics, Speech, and Signal Processing, vol. 37, No. 3, Mar. 1989, pp. 447-450.
Najar, et al., "Two-Stage Code Reference Beamformer for the Reception of Frequency Hopping Modulated Signals", Signal Processing, vol. 80 (2000), No. 12, pp. 2623-2632.
Bakhru, et al., "The Maximin Algorithm for Adaptive Arrays and Frequency-Hopping Communications", IEEE Transactions on Antennas and Propagation, vol. AP-32, No. 9, Sep. 1984, pp. 919-928.
Caini, et al., "Satelite Diversity in Mobile Satellite CDMA Systems", IEEE Journal on Selected Areas in Communications, vol. 19, No. 7, Jul. 2001, pp. 1324-1333.
Cooper, "Antennas Get Smart", Scientific American, Jul. 2003, pp. 49-55.

* cited by examiner

*Primary Examiner* — George Eng
*Assistant Examiner* — Nam Huynh
(74) *Attorney, Agent, or Firm* — Edward W. Callan

(57) ABSTRACT

A relay terminal for relaying communication signals from originator user terminals to destination user terminals stores relay-authorization-and-priority data for a plurality of user terminals having respective identification codes; detects the identification codes in communication signals sent from a plurality of originator terminals; processes the detected identification codes in combination with the stored data to determine if immediate relaying of the received communication signals to respective identified destination terminals is authorized; and relays the received communication signals immediately to only those of the identified destination terminals to which immediate relaying is so authorized. Directional-position data associated with a given originator terminal derived by processing portions of a signal received from such originator terminal is processed to form a beam path for communications with the given originator terminal.

32 Claims, 16 Drawing Sheets

RELAYED SIGNAL COMMUNICATIONS

BACKGROUND OF THE INVENTION

The present invention generally pertains to telecommunications and is particularly directed to relaying communication signals from originator user terminals to destination user terminals.

Communication signals are relayed from originator terminals to destination terminals by relay terminals. Relay terminals may be disposed in towers, communication satellites and/or aircraft. Typically, the user terminals are ground-based.

In the prior art, relay terminals that simultaneously receive a plurality of communication signals for relay to a plurality of destination terminals operate either as "bent pipe" relays, or as "processing" relays with fixed channel assignments. With "bent pipe" relays, the received signals are repeated directly to either the destination terminals, or to one or more gateway terminals for further processing. Control of access to bent pipe relays is only by administrative means. Examples of systems using bent pipe relays include Inmarsat, Globalstar, and DSCS-III.

With processing relays, multiple channels are established by onboard processing. These channels are separated on the uplink by the onboard processing relay, such as by channel filtering, or dehopping of frequency hopping signals, and demodulation/decoding. The data streams of the various uplink-processing channels are switched to the downlink paths, and then encoded and modulated for transmission via the downlink to the destination terminals. With on-board processing, relay access is achieved by any terminal having the appropriate combination of time/frequency spectral occupancy and modulation/coding. In the prior art, the relationship between the established uplink channels and the downlink channels is determined by quasi-static connections stored in an onboard data table in the relay terminal. In processing relay systems, uplink receivers, demodulators and decoders, and downlink coders, modulators and transmitters, are assigned to specific channels on a quasi-static basis. Examples of systems using processing relays include Iridium, Thuraya, AceS, and Milstar.

In many of the satellite relay systems using either bent pipe relays or on-board processing, a given user may use a special access request channel to request the assignment of a communications channel. Access requests are serviced by a ground-based control station and are fulfilled by assignment of a communications channel. The channel assignments are distributed to the requester and any other users that may be involved in the communications; and commands that are sent up to the satellite relay terminal configure the payload switching/routing and other signal processing that are incident to relaying of the communications signals that are received by the relay terminal.

In both classes of systems, the antenna system may have multiple beams, each with individual relay or processing capabilities, and different coverage areas. The assignments among the beams and the relay/processing capabilities are also static or quasi-static.

Blockage of propagation paths substantially constrains the reliability of relaying by airborne or space-borne relay terminal. Previous approaches to provide deliberate path diversity, with appropriate combining to increase the likelihood of proper reception, include MUBLCOM and Globalstar. In the MUBLCOM approach, a combination of coded frequency hopping signals, bent pipe relays (with some interference suppression processing), and multiple independent receivers for reception of relayed and direct path signals, and non-coherent combining, provides for direct user-user reliable communications via whatever paths are available. In the Globalstar approach, a combination of coded direct sequence signals, bent pipe relays, and hub processing, and coherent combining of available relayed signals, provides cellular-like communications between mobile users to (via the hubs), the ground infrastructure or other mobile users. A limitation of the MUBLCOM approach is that the relays do not reject interference, and do not provide positive control of access to the relay resources. Limitations of the Globalstar approach are that the relays do not reject interference, accurate real-time power control must be achieved to maximize capacity, and control of access and relaying are performed through hubs.

In the prior art, relay terminals that simultaneously receive a plurality of communication signals for relay to a plurality of destination terminals forward service requests that include user terminal identification codes to terrestrial gateway control terminals, which process such service requests in combination with stored authorization data to determine a priority in which the received communications signals are relayed to the respective destination terminals. Typically, different frequency-hopping patterns are applied to the respective relayed signals; and depending upon the relative positions of the relay terminal and the destination terminals some of the communication signals may be relayed within different beam paths.

SUMMARY OF THE INVENTION

The present invention provides a relay terminal for relaying communication signals from originator user terminals to destination user terminals, comprising: a memory storing relay-authorization-and-priority data for a plurality of said originator user terminals and destination user terminals having respective identification codes; means for simultaneously receiving communication signals sent from a plurality of said originator terminals for relay to a plurality of said destination terminals that are identified in said received communication signals, wherein said received signals include identification codes for said originator terminals and identification codes for said identified destination terminals; means for detecting said identification codes in said received communications signals; a computer adapted for processing said detected identification codes in combination with said stored data to determine if immediate relaying of said received communication signals to respective said identified destination terminals is authorized; and means for relaying said received communication signals immediately to only those of said identified destination terminals to which immediate relaying is authorized in accordance with said determination.

The relay terminal of the present invention also forms beam paths for relaying of the received communication signals and applies different frequency hopping patterns to the relayed communication signals, as further described in relation to the description of the preferred embodiments.

The present invention also provides a computer readable storage medium for use with a computer, wherein said medium programs the computer for performing at least one of the functions performed by the processors described in the detailed description.

Accordingly, the present invention provides a signal structure and processing techniques that immediately provide resources for fulfilling service requests that satisfy certain authorization and priority criteria by effecting immediate sharing of relay processing and antenna sources, thereby substantially increasing the effective throughput for a fixed amount of total relay resources, as well as minimizing transfer delay for time-critical communications such as voice. The positive access control provided by the present invention limits unauthorized use of the payload and system resources.

Additional features of the present invention are described with reference to the detailed description of the preferred embodiments.

DETAILED DESCRIPTION

Figure 1:
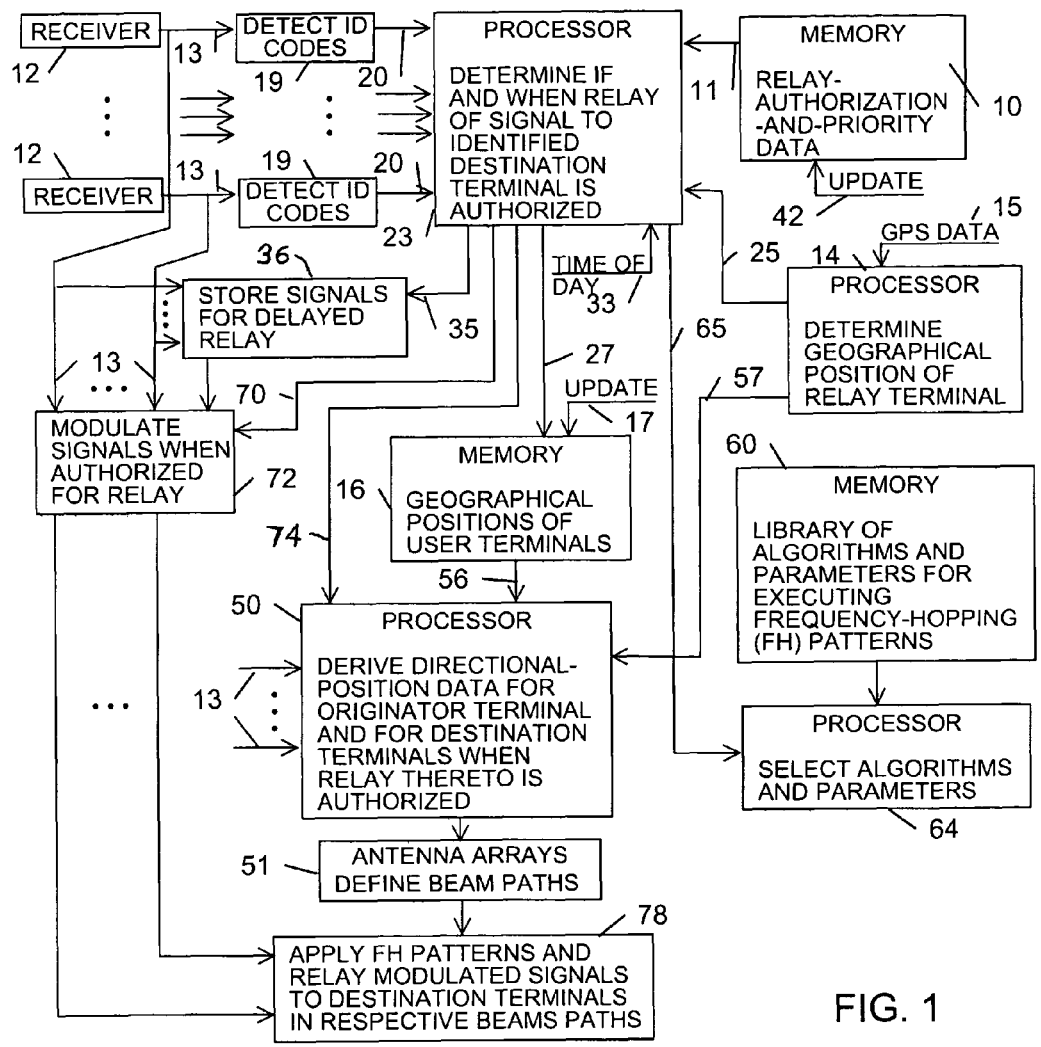
FIG. 1 is a functional block diagram for a preferred embodiment of a relay terminal according to the present invention.

A preferred embodiment of a relay terminal according to the present invention for relaying communication signals from originator user terminals to destination user terminals includes an assortment of apparatus for performing the combinations of functions shown in FIGS. 1-5. The processors included in the preferred embodiments described herein are digital signal processors. Some of the processors shown separately in the Drawing may be combined in a single processor; and one or more of the processors shown in the Drawing as individual processors may be embodied as a plurality of processors. The relay terminal is disposed in a tower, a communications satellite or an aircraft, such as an airplane, a helicopter, a dirigible, a blimp, or a balloon, which may be either manned or unmanned. The user terminals are either ground-based or airborne.

The relay terminal includes a memory 10 that stores relay-authorization-and-priority data for a plurality of user terminals having respective identification codes and a plurality of receivers 12 for simultaneously receiving communication signals sent from a plurality of originator terminals for relay to a plurality of destination terminals that are identified in the received communication signals. The received signals 13 include identification codes for the originator terminals and identification codes for the identified destination terminals. Multiple tables of the relay-authorization-and-priority data are stored in the memory for use at different times and/or different locations of the relay terminal.

Figure 6:
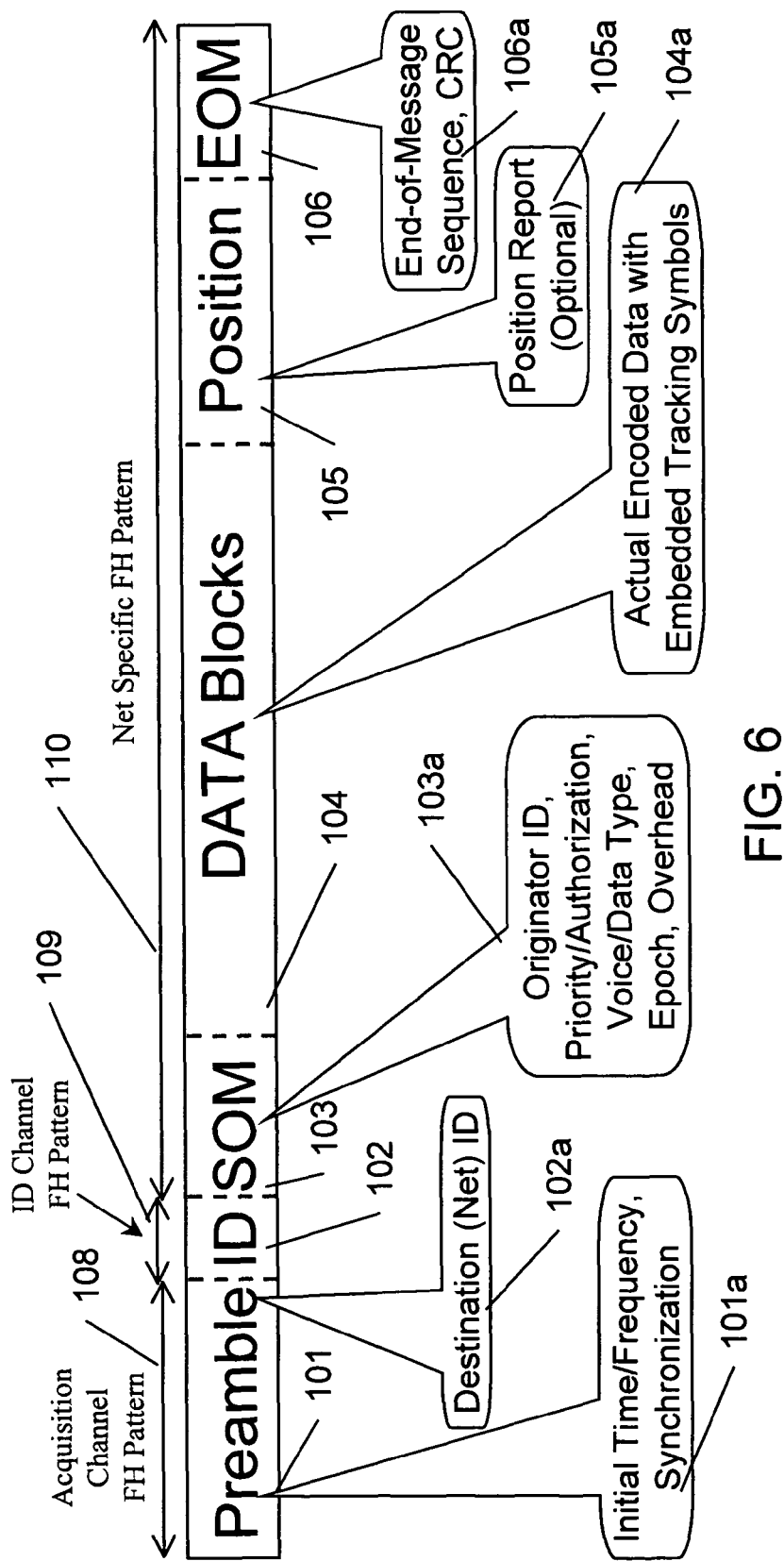
FIG. 6 illustrates the uplink transmission structure of communication signals received by the preferred embodiment of the relay terminal.

The transmission structure of an uplink communication signal received by the relay terminal from an originator terminal is shown in FIG. 6. The preamble portion 101 includes initial time/frequency data, and synchronization data, as shown at 101a. The ID portion 102 includes destination terminal/network identification (ID) codes, as shown at 102a. Each user terminal that is included in a given network includes both a terminal ID code and a network ID code. The ID portion 102 includes either a destination terminal ID code or a destination network ID code, which is processed for relaying the received signal to every user terminal within the given network.

The SOM portion 103 includes the originator terminal identification (ID) code, priority/authorization data, a voice/data-type indicator, epoch data and overhead data, as shown at 103a. The data blocks portion 104 includes encoded communication data with embedded tracking symbols, as shown at 104a. The position portion 105, which is disabled or optional and not necessarily included in all embodiments, includes a position report providing data indicating the geographical position of the originator terminal, as shown at 105a. The EOM portion 106 includes an end-of-message sequence and a CRC, as shown at 106a.

The uplink transmission structure supports auto-routing, priority and preemption. The data blocks portion 104 is received only if the SOM portion 103 is received to thereby prevent the changing of the meaning of the actual encoded data.

Different frequency hopping patterns are applied to different sections of the uplink transmission structure. An acquisition channel-hopping pattern is applied to a section 108 consisting of the preamble portion 101. An ID channel-hopping pattern is applied to a section 109 consisting of the ID portion 102. A net specific hopping pattern is applied to a section 110 consisting of the SOM portion 103, the data blocks portion 104, the optional position portion 105 and the EOM portion 106.

The relay terminal also includes a processor 14 that is adapted to process GPS (global positioning system) data 15 to determine the geographical position of the relay terminal; and a memory 16 that stores data indicating the geographical positions of the user terminals. The geographical position data for the user terminals may indicate a general region or be coordinate specific. The user-terminal-position data in the memory 16 is updated from time to time in response to updated user terminal position data 17, such as provided in the position portion 105 of a received communication signal.

Figure 2:
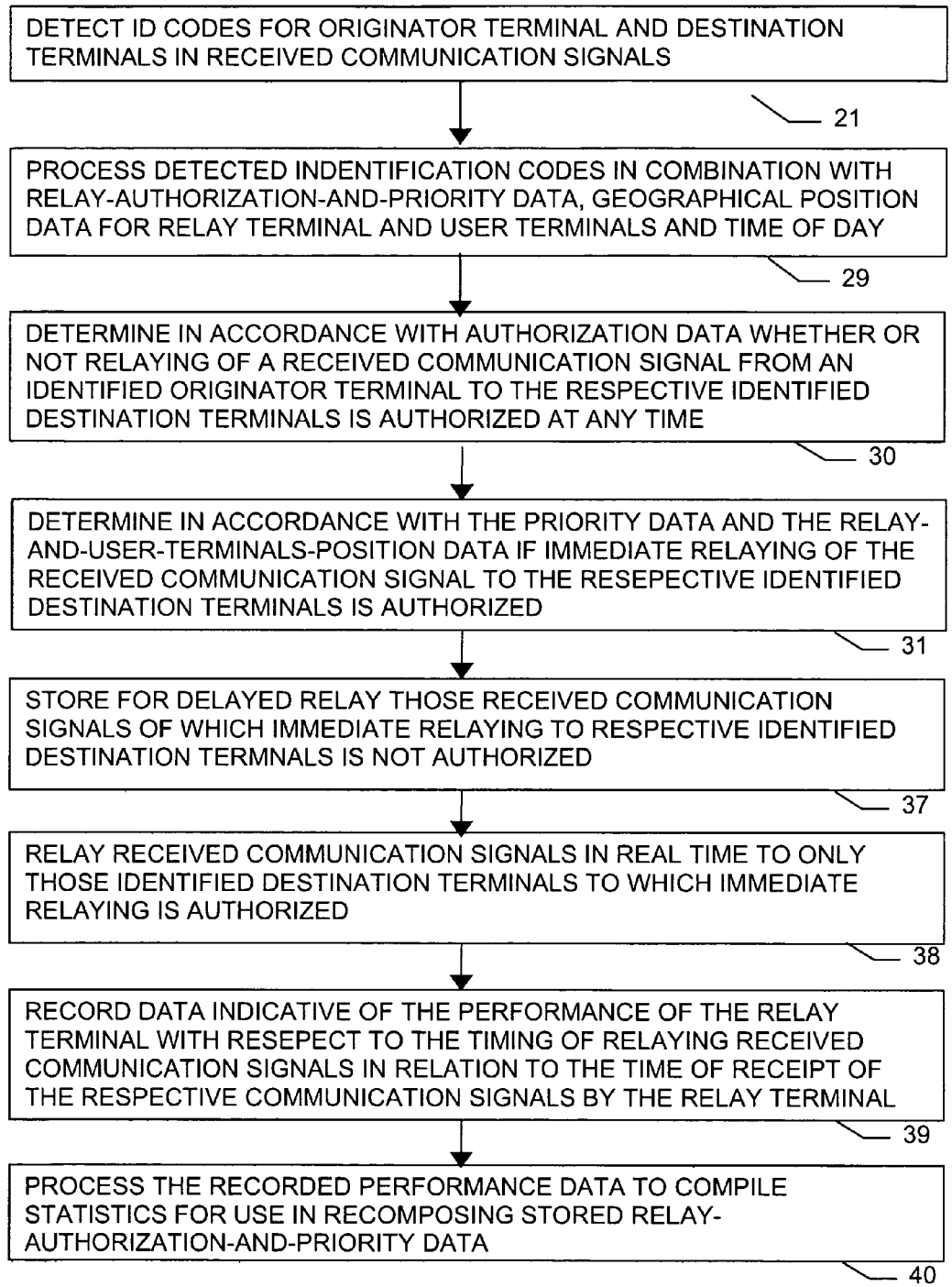
FIG. 2 is a functional diagram showing various steps performed by the relay terminal of FIG. 1 in relation to determining if immediate relaying of a received signal to respective identified destination terminals is authorized.

The relay terminal further includes a signal processor 19 that is adapted to detect the identification (ID) codes 20 in each received communications signal, as shown by block 21 in FIG. 2; and a signal processor 23 that is adapted to process the detected identification codes 20 in combination with the stored relay-authorization-and-priority data 11, as shown by block 29, to determine if relaying of the received communication signal to the respective identified destination terminals is authorized at any time, as shown by block 30, and if so authorized, then whether immediate relaying of the received communication signal to the respective identified destination terminals is authorized, as shown by block 31.

In some, but not all, embodiments, the processor 23 is adapted for processing the detected identification codes 20 and the stored relay-authorization-and-priority data 11 in combination with the stored geographical-position data 25 for the relay terminal and the stored geographical-position data 27 for the identified destination terminals, as also shown by block 29, to determine whether relaying of the received communication signal 13 to the respective identified destination terminals is authorized in accordance with the relative positions of the relay terminal and the identified destination terminals. This feature is not necessary when the destination terminals are located within the footprint of the beam path of a transmission of the received communication signal back to the originator terminal.

In some, but not all, embodiments, the processor 23 is adapted for processing the detected identification codes 20 and the stored relay-authorization-and-priority data 11 in combination with the time-of-day 33, as also shown by block 29, to determine whether immediate relaying of the received communication signals 13 to respective identified destination terminals is authorized in accordance with the time of day.

In some, but not all, embodiments, both the time of day 31 and the geographical-position data 25 for the relay terminal and the geographical-position data 27 for the identified destination terminals are processed by the processor 23 in combination with the detected identification codes 20 and the stored relay-authorization-and-priority data 11 to determine whether immediate relaying of the received communication signal to the respective identified destination terminals is authorized.

When relaying of a received communication signal 13 is authorized but immediate relaying of a received communication signal 13 is not authorized to one or more of the destination terminals identified by an identification code in the received signal, a command 35 by the processor 23 causes the received communication signal 13 to be stored in a buffer 36, as shown by block 37, and in some embodiments a message is sent to the originator terminal reporting that the received communication signal was not relayed immediately to the destination terminal or terminals that are identified in such message. Such message is not sent when the signal relaying traffic is too heavy to allocate bandwidth for such message. When the stored communication signal is eventually transmitted another message reporting such transmission is sent to the originator terminal.

The relay terminal relays the received communication signals 13 immediately to only those of the identified destination terminals to which immediate relaying is authorized in accordance with the determinations by the processor 23, as shown by block 38.

Figure 7:
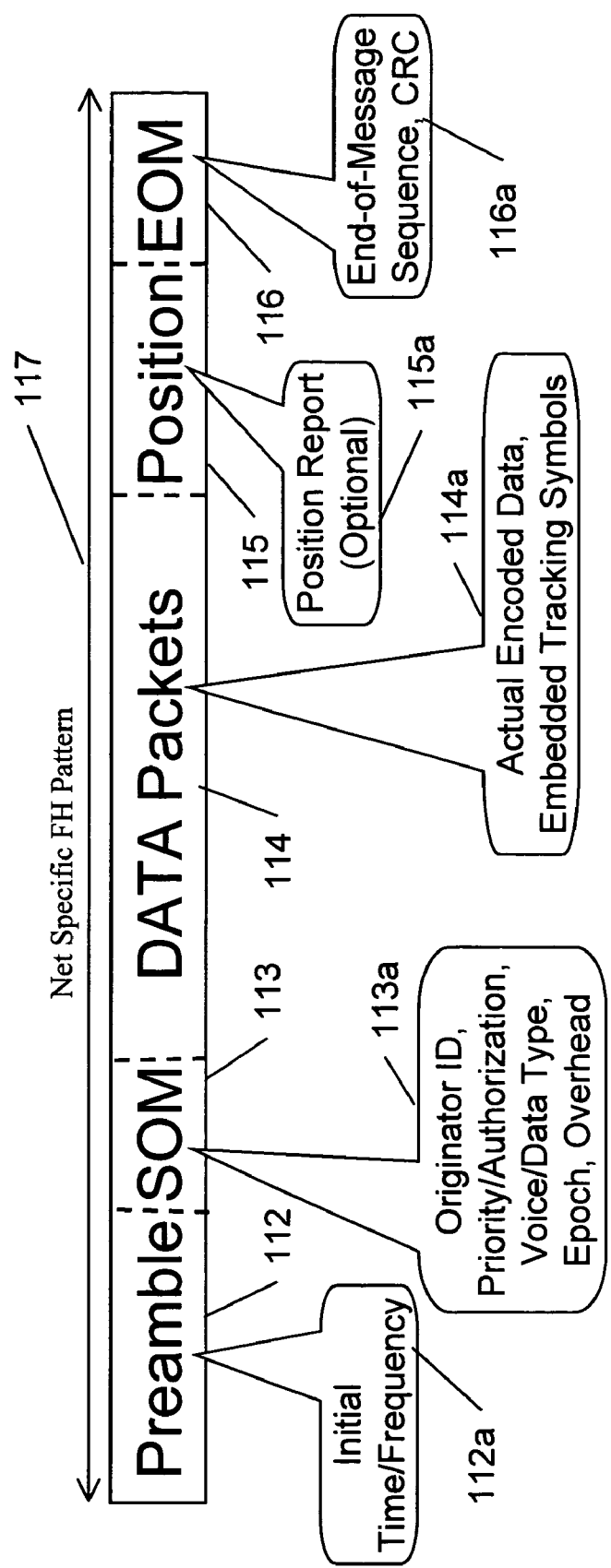
FIG. 7 illustrates the downlink transmission structure of communication signals relayed by the preferred embodiment of the relay terminal.

The transmission structure of downlink communication signal relayed by the relay terminal to the destination terminals is shown in FIG. 7. The preamble portion 112 includes initial time/frequency data, as shown at 112a. The SOM portion 113 includes the originator terminal identification (ID) code, priority/authorization data, a voice/data-type indicator, epoch data and overhead data, as shown at 113a. The data packets portion 114 includes encoded communication data with embedded tracking symbols, as shown at 114a. The position portion 115, which may be disabled or optional and not necessarily included in all embodiments, includes a position report providing data indicating the geographical position of the originator terminal, as shown at 115a. The EOM portion 116 includes an end-of-message sequence and a CRC, as shown at 116a.

The downlink transmission structure is similar to the uplink transmission structure. The preamble portion 112 permits guarding of downlinks from different relay terminals. A net specific hopping pattern is applied to a section 117 consisting of the preamble portion 112, the SOM portion 113, the data packets portion 114 and the EOM portion 115.

The processor 23 records data indicative of the performance of the relay terminal with respect to the timing of relaying the received communication signals in relation to the time of receipt of the respective communication signals by the relay terminal, as shown by block 39, and a processor that is disposed apart from the relay terminal downloads and processes the recorded performance data, as shown by block 40, to compile statistics for use in recomposing the relay-authorization-and-priority data that is stored in the memory 10.

Figure 3:
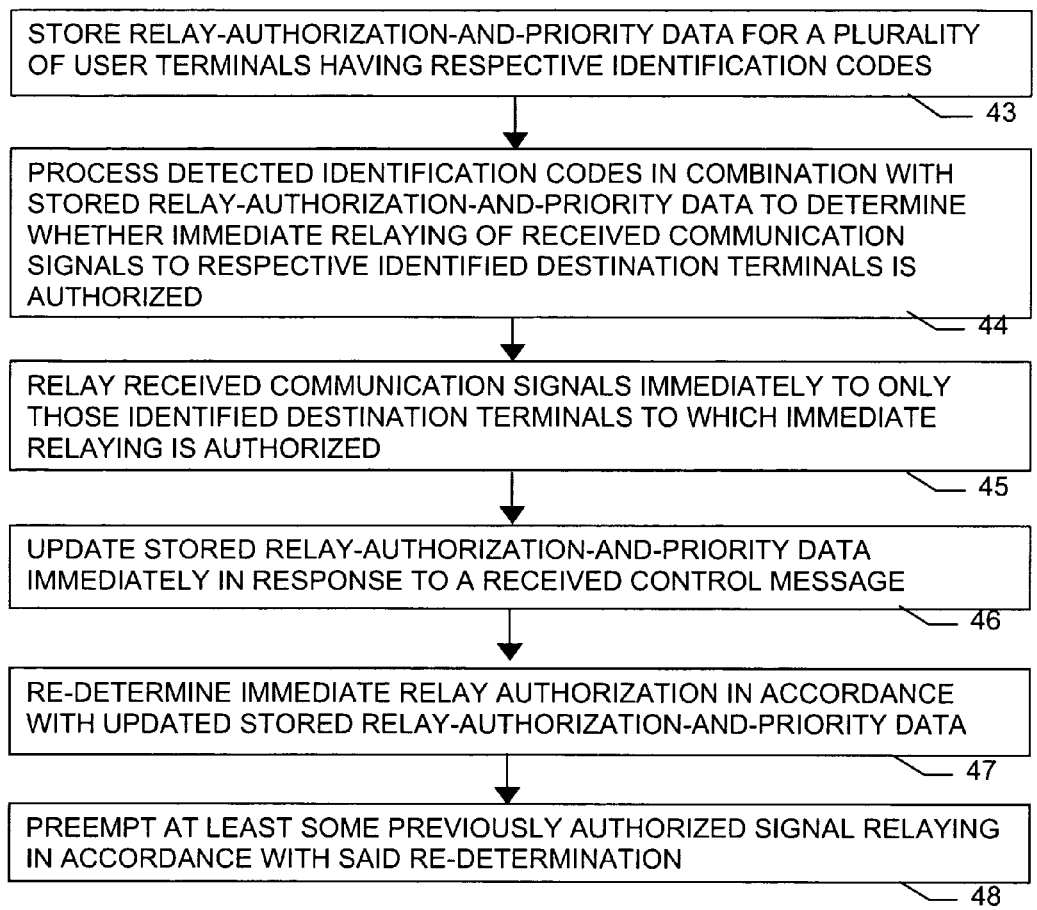
FIG. 3 is a functional diagram showing various steps performed by the relay terminal of FIG. 1 in relation to redetermining if immediate relaying of a received signal to respective identified destination terminals is authorized in accordance with updated priority data.

The processor 23 is adapted for re-determining the immediate-relay authorization in accordance with the updated stored relay-authorization-and-priority data and to preempt at least some previously authorized signal relaying in accordance with such re-determination, as further described with reference to FIG. 3. Relay-authorization-and-priority data for a plurality of user terminals having respective identification codes is stored in the memory 10, as shown by block 43. The processor 23 processes the detected identification codes 20 in combination with the stored relay-authorization-and-priority data 11 that is then applicable in accordance with the time of day and the location of the relay terminal to determine if immediate relaying of the received communication signals to respective identified destination terminals is authorized, as indicated by block 44; and the relay terminal relays the received communication signals immediately to only those of the identified destination terminals to which immediate relaying is authorized, as shown by block 45.

The relay-authorization-and-priority data stored in the memory 10 is updated immediately in response to a received control message 42, as shown by block 46. The processor 23 re-determines the immediate-relay authorization in accordance with the updated stored relay-authorization-and-priority data, as shown by block 47, and preempts at least some previously authorized signal relaying in accordance with such re-determination, as shown by block 48.

It should be noted that preemption occurs only when there is such congestion of received communication signals that the number of received communication signals for which relaying is authorized and/or the power required for relaying the same exceeds the number of number of communication signals that the relay terminal is capable of immediately relaying and/or the power required for relaying the same. When there is such congestion, one of three scenarios occurs when a new communication signal is received. Either, (1) the priority that is determined for immediate relaying of the newly received signal exceeds the priority for immediate relaying of a signal previously authorized for immediate relaying, in which case immediate relaying of the previously authorized signal having the lowest priority is preempted by immediate relaying of the newly received signal; (2) the priority that is determined for immediate relaying of the newly received signal does not exceed the priority for immediate relaying of any of the signals previously authorized for immediate relaying, in which case the newly received signal is stored in the buffer 36 for future relaying, as described above; or (3) the priority that is determined for immediate relaying of the newly received signal does not exceed the priority for immediate relaying of any of the signals previously authorized for immediate relaying and is not high enough for storage in the buffer 36 in relation to other signals stored in the buffer 36, in which case the newly received signal is not stored in the buffer 36 for future relaying and a message may be sent to the originator terminal reporting that the newly received communication signal is not being relayed.

In some embodiments, if a signal stored in the buffer 36 has not been sent within some predetermined time interval after being stored in the buffer 36 or has been preempted for such storage by a later received signal that is not immediately relayed, such stored signal is removed from the buffer 36 and a message may be sent to the originator terminal reporting that such stored signal is not being relayed.

Figure 8:
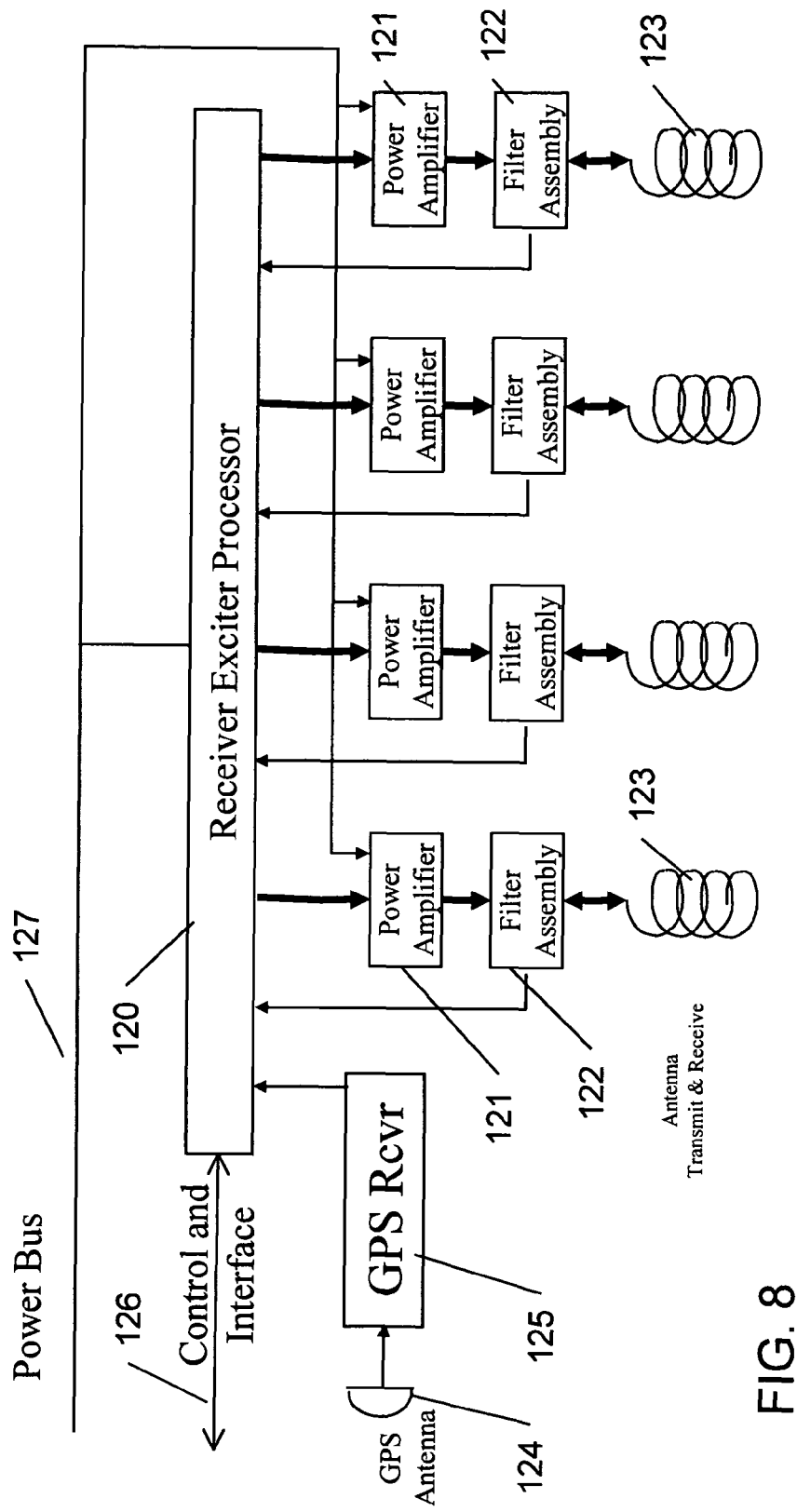
FIG. 8 is a block diagram of various components of a preferred embodiment of a relay terminal according to the present invention.

Referring to FIG. 8, a preferred embodiment of the relay terminal includes a receiver/exciter processor 120, a plurality of power amplifiers 121, a corresponding plurality of filter assemblies 122 and a corresponding plurality of transmitting and receiving antenna elements 123, which are combined as shown therein. The relay terminal also includes a GPS antenna 124 and a GPS receiver 125. The antenna elements 123 are operated as a multiple-element, phased-array. In one embodiment, four elements are preferred. The payloads are autonomous. A control and interface bus 126 is connected to the receiver/exciter processor 120; and a power bus 127 in connected to the receiver/exciter processor 120 and the power amplifiers 121. The receiver/exciter processor 120 includes some hardware components for receiving functions that are identical to but separate from the hardware components of the receiver/exciter processor 120 that are used for transmission functions. Different sets of software are provided for the respective receiving and transmission functions.

Figure 9:
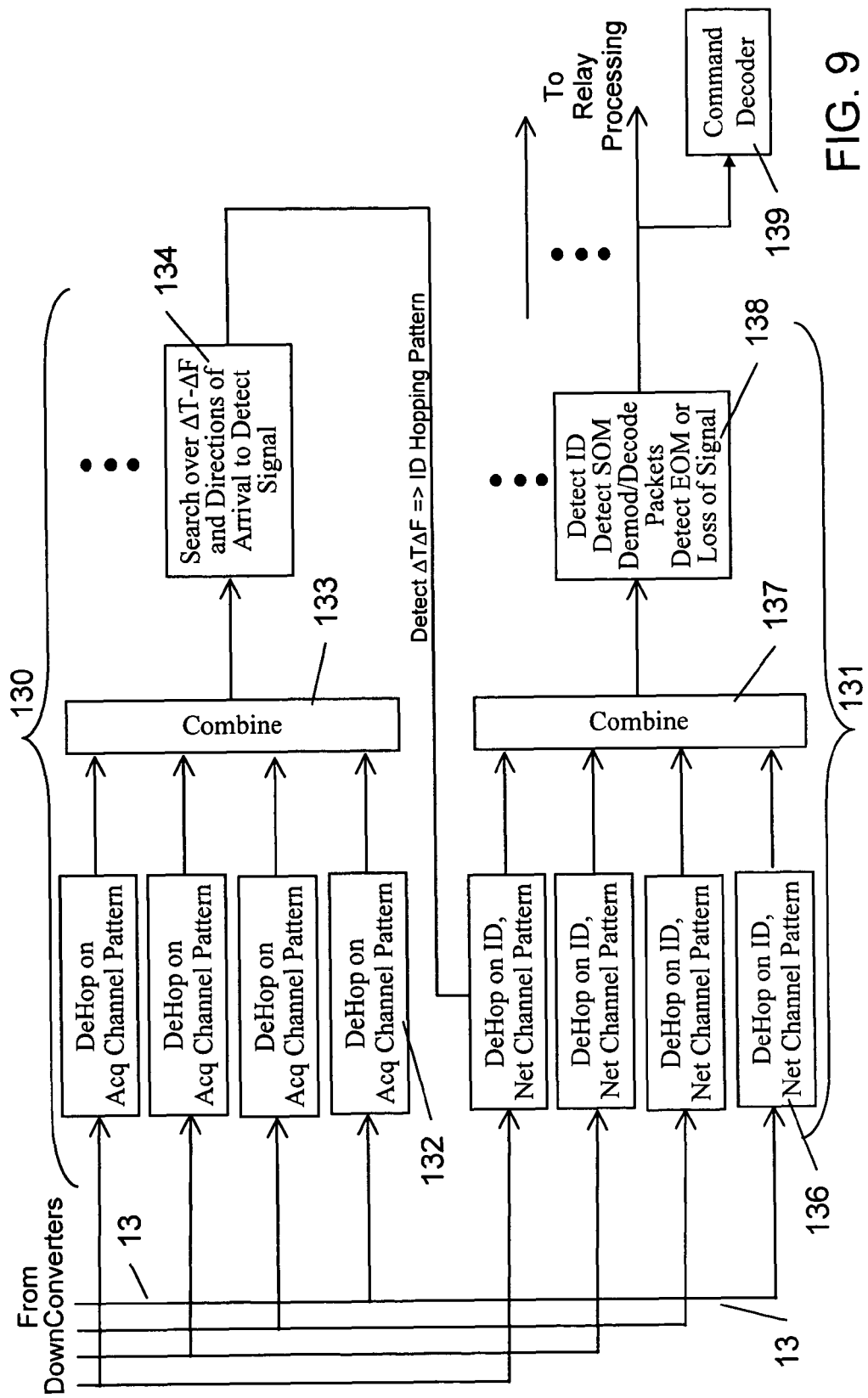
FIG. 9 is a functional block diagram of the received-signal-processing portion of a preferred embodiment of the relay terminal.
Figure 11:
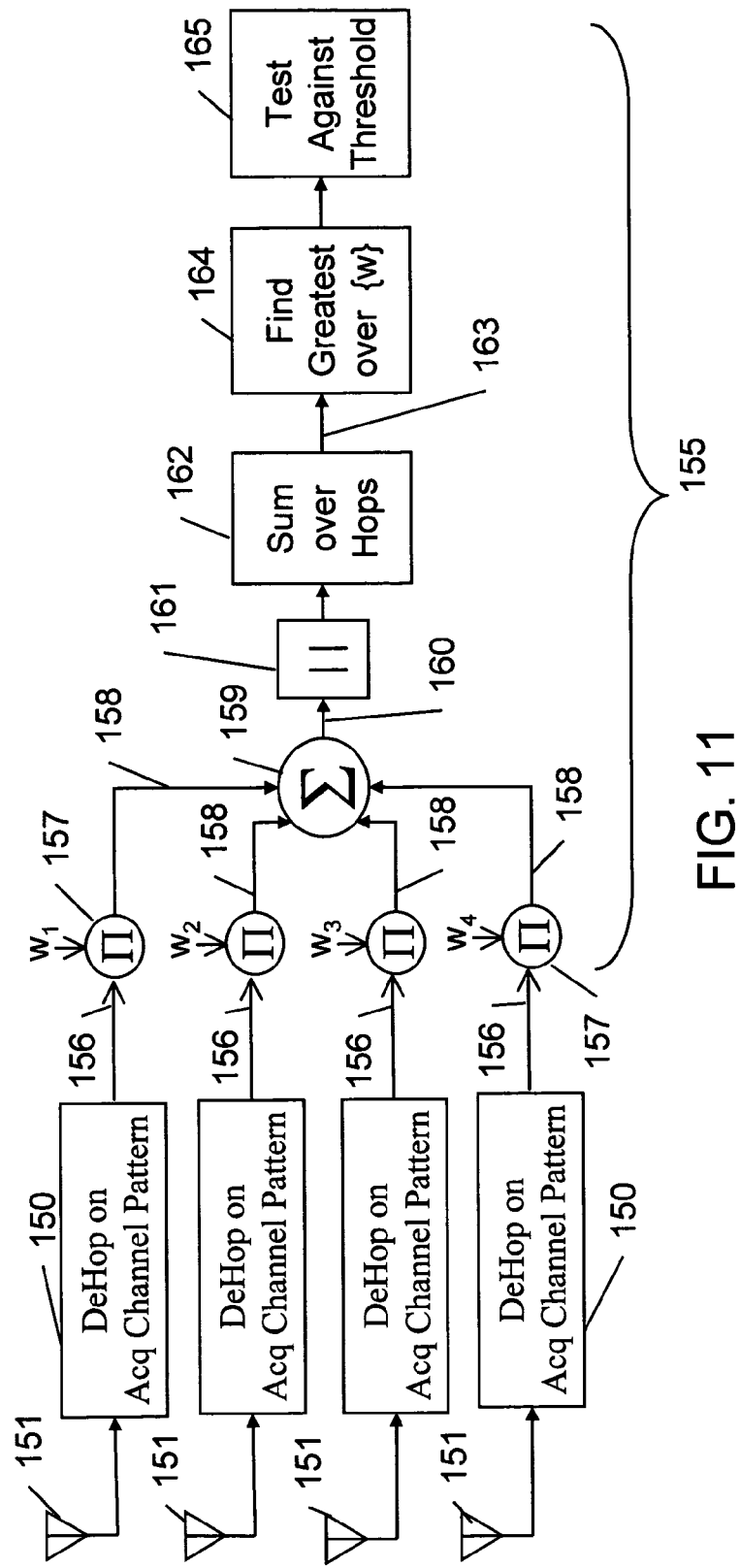
FIG. 11 is a functional diagram showing the processing of a received communication signal to determine the directional position of an originator terminal in accordance with a preferred embodiment of the present invention.

Referring to FIG. 9, a preferred embodiment of the received-signal-processing portion of the relay terminal includes a plurality of simultaneous acquisition channels 130 and a plurality of simultaneous demodulation channels 131 that receive the received communication signal 13 from down converters. In a preferred embodiment, the relay terminal includes five simultaneous acquisition channels 130 and forty simultaneous demodulation channels 131. Each of the acquisition channels 130 includes a plurality of signal processors 132 for dehopping the received communication signal 13 on a frequency-hopping pattern, a signal combiner 133, and a processor 134 for searching over a plurality of sets of arrival time/frequency offsets (ΔT-ΔF) and directions of arrival to detect the received communication signal 13. These functional components 132, 133, 134 are combined as shown in FIG. 11

Each of the demodulation channels 131 includes a plurality of (preferably four) signal processors 136 for dehopping the received communication signal 13 on a net channel pattern; a signal combiner 137; a processor 138 for detecting the ID portion 102, the SOM portion 103, the position portion 105 and the EOM portion 106 of the received signal 13 and/or a loss of the received signal; and a command decoder 139. The signal combiner 137 combines the dehopped signals in accordance with the detected direction of arrival of the received signals 13. The processor 138 also demodulates and decodes the packets in the data blocks portion 104 of the received signal 13. These functional components 136, 137, 138, 139 are combined as shown in FIG. 9. A high quality oscillator that is calibrated by the GPS receiver sets the frequency. An on-board clock that is calibrated by the GPS receiver sets the time. Such settings and calibration can be made by remote commands.

Figure 10:
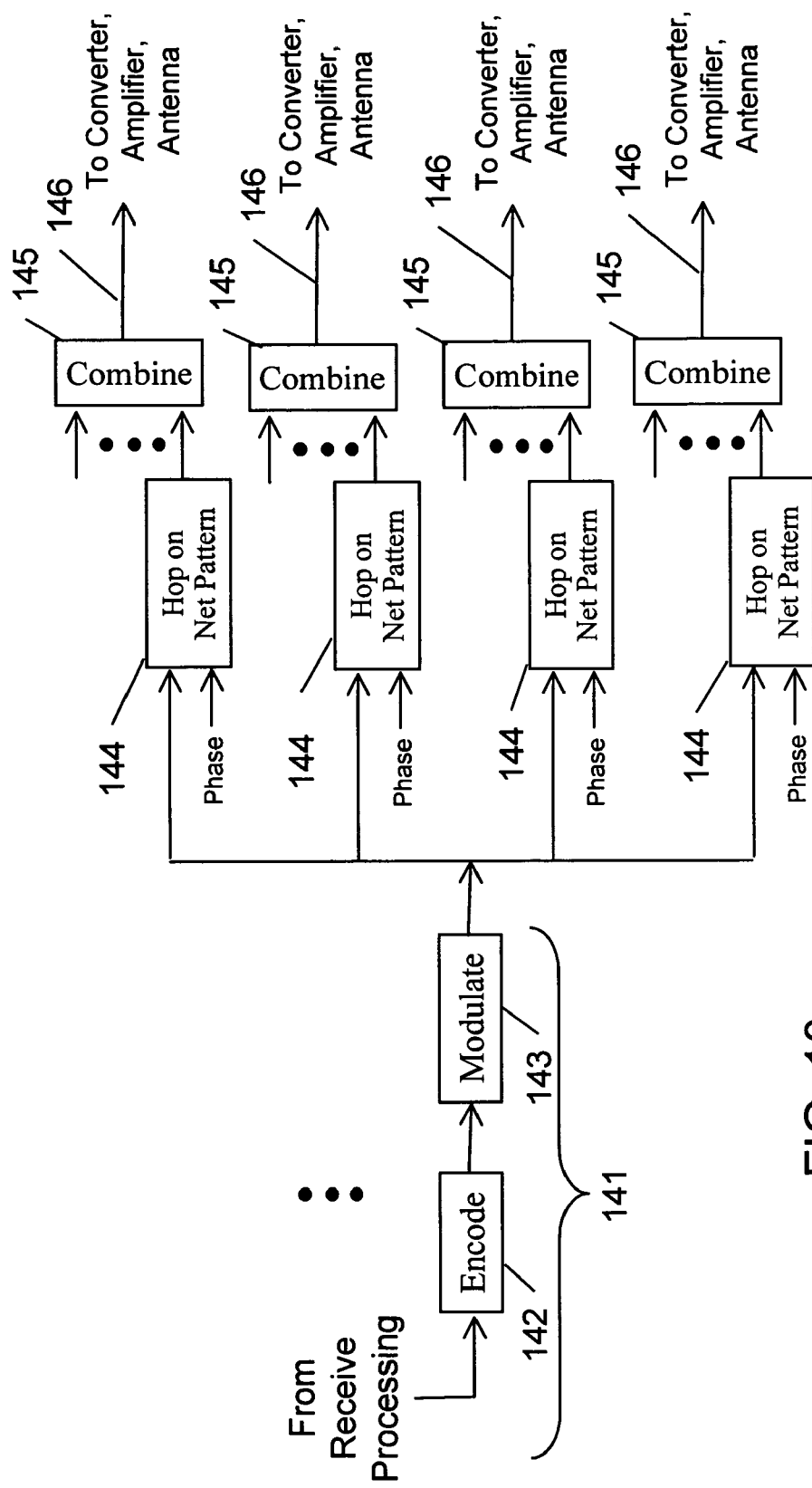
FIG. 10 is a functional block diagram of the relayed-signal-processing portion of a preferred embodiment of the relay terminal.

Referring to FIG. 10, a preferred embodiment of the relayed-signal-processing scheme includes plurality of (preferably fifty) simultaneous transmit channels, 141, in each of which a respective signal is encoded 142, modulated 143, and subjected to application of a frequency-hopping pattern by a plurality of (preferably four) "hop on net pattern" processors 144, combined 145 with other signals, and forwarded 146 to a converter, amplifier and antenna for transmission. These functions 142, 143, 144, 145, 146 are combined as shown in FIG. 10. This scheme provides a low incremental cost of transmit processing.

In order to define beam paths for relaying of a received communication signal 13 to the destination terminals and for transmission of such signal back to the originator terminal, the relay terminal further includes a processor 50 that is adapted to derive directional-position data for the originator terminal and for the destination terminals to which immediate relay of a communication signal 13 from the originator terminal is authorized. The direction of arrival of a given signal 13 received from a given originator terminal is detected by processing portions of the given signal 13 received prior to detection by the signal processor 19 of the identification codes in the given signal 13. The directional-position data associated with the given originator terminal is derived from the detected direction of arrival of the given received communication signal 13. The derived directional-position data is utilized to command an adaptive antenna array 51 to define beam paths for relaying the received communication signal to the destination terminals and for transmission of such signal back to the originator terminal.

Figure 4:
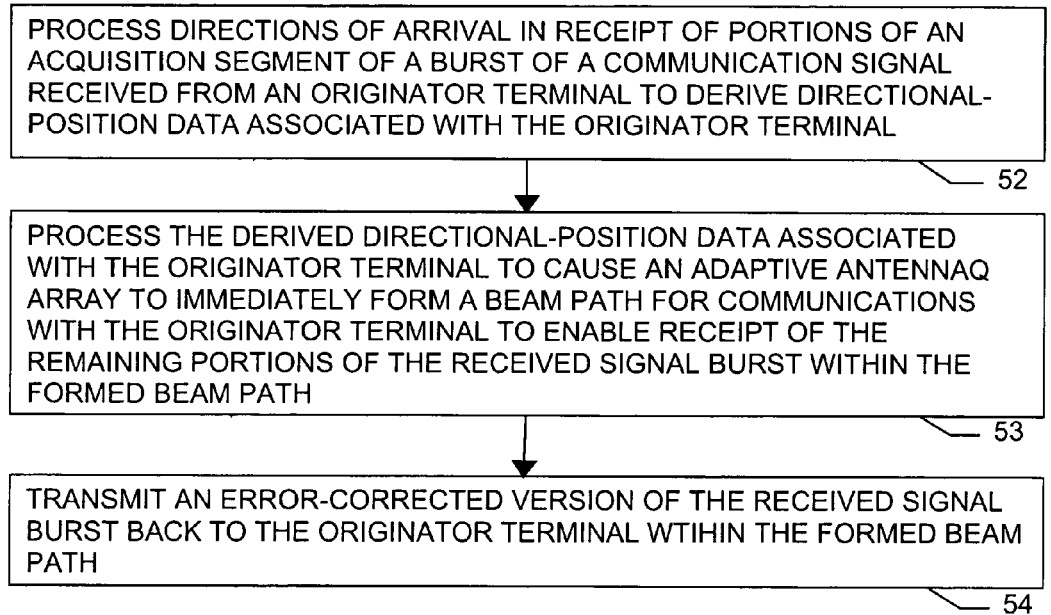
FIG. 4 is a functional diagram showing various steps performed by the relay terminal of FIG. 1 in relation to defining a beam path for communications with the originator terminal.

Referring to FIG. 4, the processor 50 processes portions of an acquisition segment of a burst of a communication signal received by the plurality of the receivers 12 from the originator terminal to detect the direction of arrival of the given communication signal 13 and thereupon derive the directional-position data associated with the given originator terminal, as shown by block 52. Such derivation of directional-position data is further described with reference to FIGS. 11 and 12, which show a processing scheme for determining the most likely of a plurality of different arrival directions for each received communication signal 13.

Referring to FIG. 11, for each acquisition channel, a plurality of (preferably four) receivers 150 are respectively coupled to different antenna elements 151 for receiving a preamble portion of the transmitted communication signal 13 within a given acquisition channel. Each receiver 150 is adapted for receiving a transmitted signal that has frequency-hopped segments in the preamble portion, as shown by block 153 in FIG. 12; and each of the receivers is adapted for dehopping the frequency-hopped segments, as shown by block 154. The receivers 150 also convert the received signals 13 to baseband and convert the baseband signals from analog signals to digital signals. The use of digital processing permits many simultaneous signals of interest to be processed simultaneously without replication of the RF hardware.

Adaptive forming of the beam path is performed upon receipt of the preamble portion to maximize the received signal to noise and interference ratio (SINR). The beam-pathforming technique includes the step of summing the weighted outputs of multiple antenna elements. Let $x_i(t)$ be the output signal of the $i^{th}$ antenna element. The adaptive antenna system forms the weighted sum of the elements to generate an output $o(t)=\Sigma w_i x_i$ (t), where NAT; is the weight applied to the $i^{th}$ antenna element output. These operations are usually performed at baseband.

The vector of weights w which maximizes the signal-to-noise-plus-interference ratio is given by $w=R^{-1}p$, where $R^{-1}$ is the inverse of a matrix of correlations of the noise and interference components of the different outputs x(t), and p is the weight vector corresponding to a signal from a desired direction in the absence of interference. Computation of the weights w is separated into calculation of the noise and interference inverse $R^{-1}$, and multiplication by the steering vector for the desired direction. The preferred method for calculating $R^{-1}$ is sample matrix inversion, as described by Van Trees, "Optimum Array Processing", Wiley, 2002, Section 7.3.

It is noted that the matrix R ideally does not include the desired signal. Techniques proposed in the prior art for eliminating the desired signal from the correlation matrix include (1) gating in time or frequency to avoid the signal, and (2) collecting samples from a frequency in anticipation of the signal hopping to that frequency. In the relay terminal of the present invention the samples used to compute the noise and interference inverse are collected by one or more of the regular dehopping receivers. Specifically, all receivers not presently being used for acquisition, or demodulating incoming signals, are used to collect samples for refining the estimates of the interference and noise. Since the relay terminal computer system stores and thereby knows all the hopping patterns in use for acquisition and demodulation, such computer system commands the remaining receivers to obtain samples at frequencies not otherwise in use.

During acquisition processing of the preamble portion of the received signal, a given acquisition channel tests a full set of pointing vectors p which cover the visible surface of the earth above a specified minimum elevation angle. Acquisition is accomplished by detection in all directions for which the hopped signal exceeds a threshold.

The set of pointing vectors p for the downlink are prestored in the memory of the relay terminal computer system. The uplink pointing vectors are associated with the downlink pointing vectors, such that when an acquisition occurs on the uplink, the weights w for transmitting the corresponding down link signal are established. The processing for a single link is shown in FIG. 11. A separate set of outputs is computed for each downlink signal for each element. All the signals for a given element are added, and the resulting sum is provided for the corresponding antenna element. Whenever two or more downlink signals would transmit on the same frequency at the same time, the processing transmits only one common signal.

Figure 12:
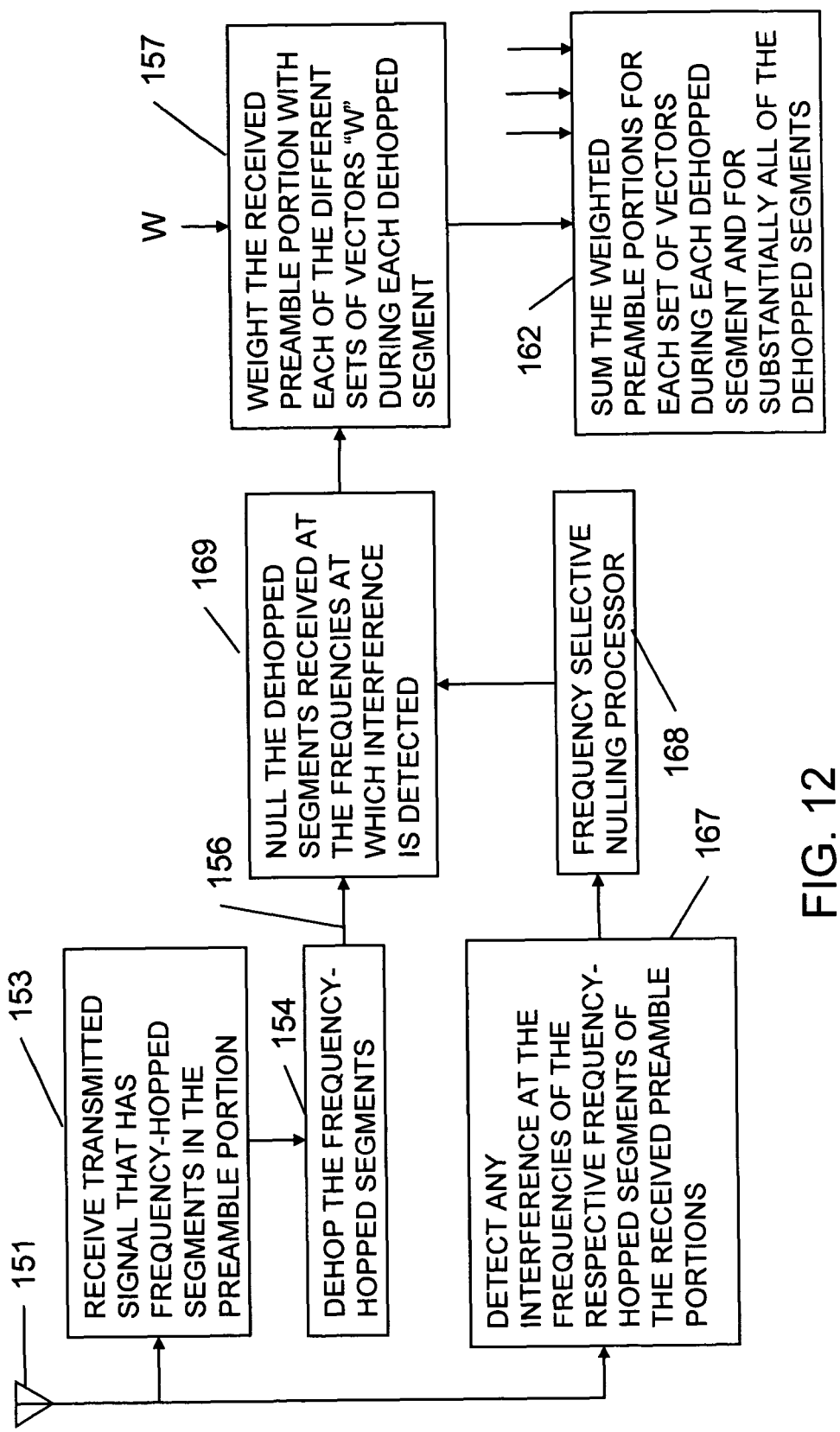
FIG. 12 is a functional block diagram of one aspect of a preferred embodiment of the processing shown in FIG. 11.

Referring to FIG. 11, a processor 155 weights each of the dehopped segments 156 of the respective received preamble portions with different sets of vectors W representing directions of arrival in said receipt of said preamble portion, as shown by block 157 in FIGS. 11 and 12. The vectors W1, W2, W3, W4 are complex numbers, which correspond to directions of arrival. In alternative embodiments, the vectors W1, W2, W3, W4 are delays and scaling factors corresponding to directions of arrival. In the preferred embodiment each of the dehopped segments 156 is weighted by sixty-one different sets of four of the vectors W. The processor 155 sums the weighted segments 158 of the preamble portions for each set of vectors W, as shown by block 159.

The processor 155 provides the absolute value of the sum 160 of the weighted segments, as shown by block 161. The absolute value may be constrained in some embodiments by clipping or nonlinear processing. The processor 155 sums these absolute values of the summed and weighted dehopped segments of the preamble portion for each set of vectors during each dehopped segment and for substantially all of the dehopped segments, as shown by block 162 in FIGS. 11 and 12.

The processor 155 determines the directional position of the source in accordance with which set of vectors W provides the highest sum 163 of weighted preamble portions, as shown by block 164. The processor 155 is adapted for determining the directional position of the source of the received communication signal 13 only when the highest sum 163 of weighted preamble portions exceeds a predetermined threshold, as shown by block 165.

When communication signals from different sources are simultaneously received and enough receivers 150 are available, the processor 155 determines the respective directional positions of each source in accordance with the highest sum 163 derived from each of the respective received signals that exceeds the predetermined threshold value. If enough receivers 150 are not available to determine the directional position of more than one source, only the source of the received signal from which the highest sum 163 exceeding the predetermined threshold value is derived is determined by the processor 155.

In the preferred embodiment, the probability of preamble collisions is less than one in one thousand due to randomized offsets in time and frequency for one hundred frequency hopping sequences. Five independent acquisition channels provide adequate separation to enable directional priority to be determined. This scheme enables detection of simultaneous messages from multiple directions.

Referring to FIG. 12, in the preferred embodiment adaptive nulling is applied to the dehopped segments of the preamble portion to minimize any distortion of the weighted sums that may be caused by interference. A detector 167 coupled to the same antenna element as the receiver 153 detects any interference at the frequencies of the respective frequency-hopped segments of the received preamble portions; and a frequency selective nulling processor 168 nulls the dehopped segments 156 received at the frequencies at which interference is detected, as shown by block 169. Because the desired frequency hopping signals are instantaneously narrowband, the preferred embodiment of the relay terminal of the present invention performs independent adaptive nulling on each resolvable narrow bandwidth. For a typical resolution of 25 kHz, there are 800 frequency bins in a total exemplary hopping bandwidth of 20 MHz.

Different sets of receivers 153 are adapted for simultaneously receiving within different acquisition channels the respective preamble portions of different transmitted communication signals; and for each acquisition channel, a processor 155 is adapted for performing the weighting, summing and determining functions described above for the preamble portions received in each of the different acquisition channels.

The processor 50 (FIG. 1) processes the derived directional-position data associated with the originator terminal to immediately cause an adaptive antenna array to form a beam path in accordance with the derived directional-position data for communications with the originator terminal to enable receipt of the remaining portions of the received signal burst within the formed beam path, as shown by block 53 in FIG. 4. The relay terminal then transmits an error-corrected version of the received signal burst back to the originator terminal within the formed beam path, as shown by block 54.

The derived directional-position data for the originator terminal is retained for use in defining a beam path to the same terminal when such terminal becomes a destination terminal. In the usual case, the user terminal is centered within the footprint of the beam path in which the received communication signal is transmitted back to the origination terminal.

The processor 50 also is adapted to derive directional-position data for user terminals that are not within the beam path centered by the origination terminal by processing the respective geographical position data 56 for the user terminals stored in the memory 16 with the geographical position data 57 for the relay terminal stored in the memory 14. The processor 50 does not perform this processing step when the user terminals are within the beam path centered by the origination terminal.

Each of a plurality of adaptive antenna arrays 51 is adapted for simultaneously relaying received communications signals within a plurality of distinct beam paths to a plurality of different destination terminals. The simultaneously relayed communication to signals may include a plurality of different communication signals simultaneously received from different originator terminals.

Figure 5:
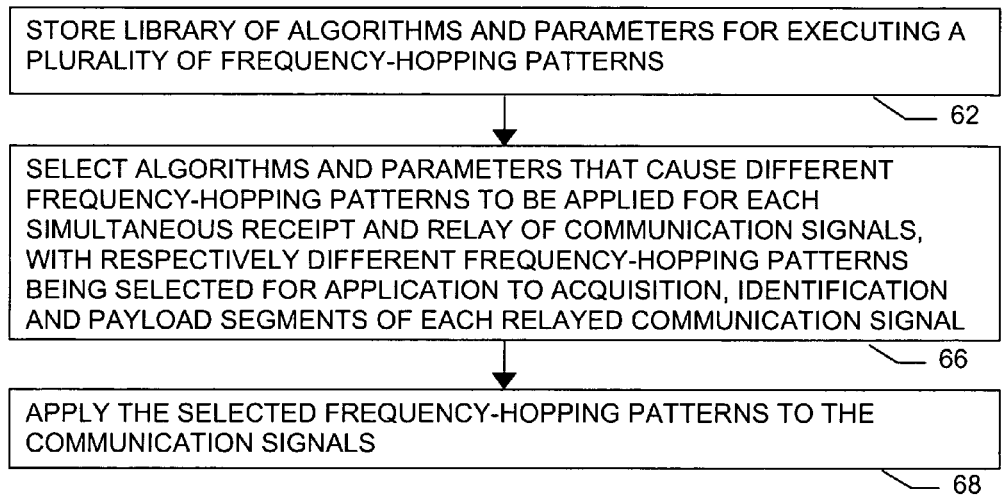
FIG. 5 is a functional diagram showing various steps performed by the relay terminal of FIG. 1 in relation to applying frequency-hopping patterns to the relayed communication signals.

In order to apply different frequency hopping patterns to the relayed communication signals, the relay terminal includes a memory 60 into which a library of algorithms and parameters for executing a plurality of frequency-hopping patterns are stored as shown by block 62 in FIG. 5; and a processor 64 that responds to commands 65 from the processor 23 selects algorithms and parameters from the library that cause different frequency-hopping patterns to be applied for each simultaneous receipt and relay of the communication signals in accordance with the authorization determinations by the processor 23.

Respectively different frequency-hopping patterns are selected for application to the acquisition, identification and payload segments of each relayed communication signal, as shown by block 66; and the selected frequency-hopping patterns are applied to the relayed communication signals and the communication signal transmitted back to the originator terminal, as shown by block 68.

When immediate relaying of a received communication signal 13 is authorized, a command 70 from the processor 23 causes a modulator 72 to modulate the authorized communication signal 13 for transmission; and a command 74 from the processor 23 causes the processor 50 to utilize the derived directional-position data to cause the adaptive antenna array 51 to form a beam path for relaying the authorized communication signal. Received communication signals 76 that are stored for delayed relay in the buffer 36 are modulated for transmission by the modulator 72 when they are authorized for relay; and beam paths are formed for such delayed relay in the same manner as they are formed for immediate relay of a communication signal.

The selected frequency-hopping patterns are applied to the modulated communication signals 76 and the modulated communication signals are relayed to the destination terminals in the respective formed beam paths, as shown by block 78

Figure 13:
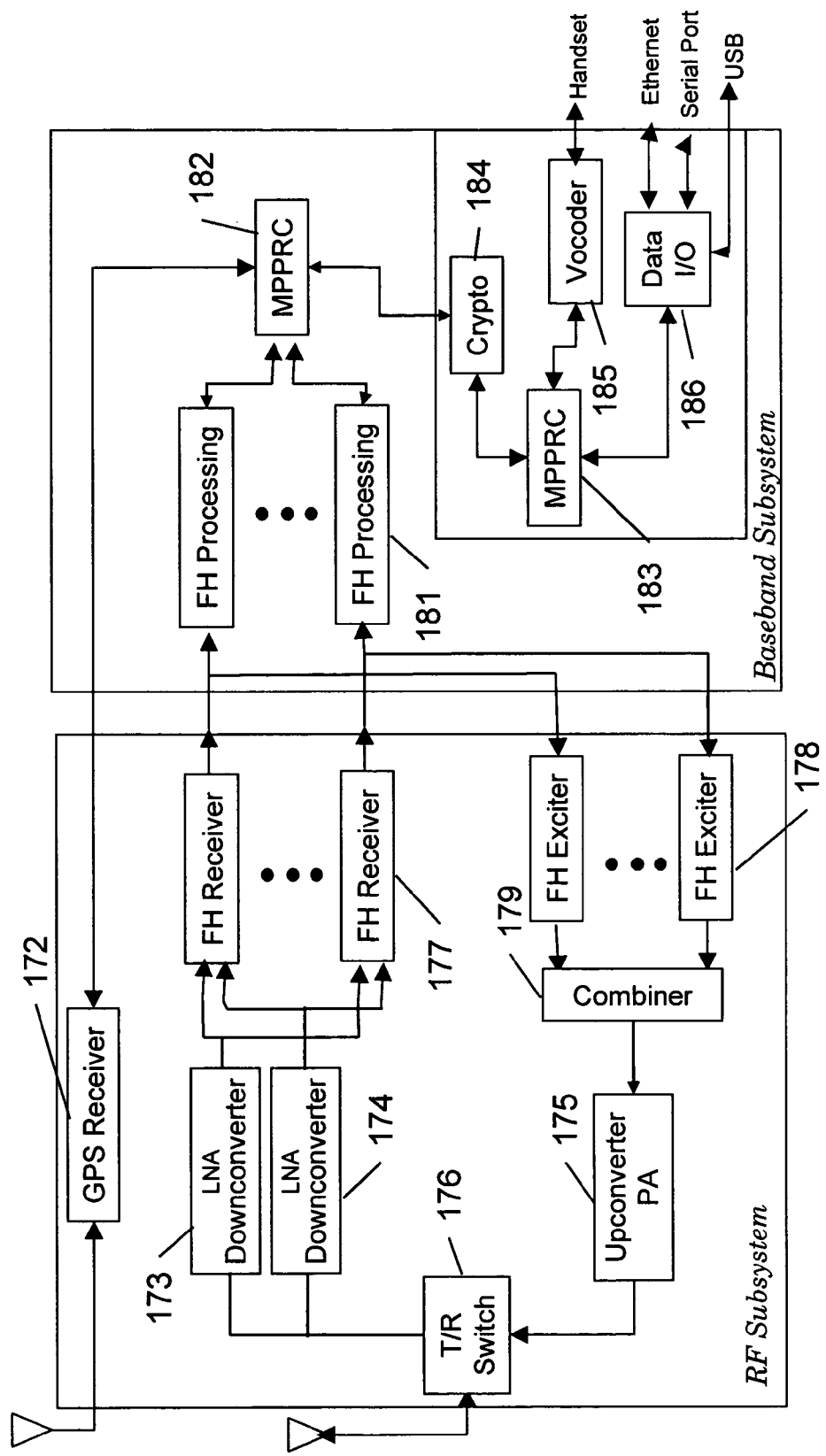
FIG. 13 is a functional block diagram of a preferred embodiment of the user terminal according to the present invention.

Referring to FIG. 13, a preferred embodiment of the user terminal includes an RF subsystem 170 and a baseband subsystem 171. The RF system 170 includes a GPS receiver 172, a first downconverter 173 and a second downconverter 174, which are operable in two different frequency bands, an upconverter 175, which is operable in the same frequency band as one of the downconverters, a transmit/receive T/R switch 176 for half-duplex operation or a full-duplex unit (not shown), a plurality of frequency-hopping receivers 177, one or more frequency-hopping exciters 178, and a combiner 179, which are combined as shown in FIG. 13.

The baseband subsystem 171 includes a corresponding plurality of frequency-hopping processors 181; a first message processing, packet routing and control system 182; a second message processing, packet routing and control system 183; a crypto unit 184, a vocoder 185, and a data input/output I/O ports 186, which are combined as shown in FIG. 13. The vocoder 185 is adapted for connection to a handset. The data I/O ports include an Ethernet port, a serial port and a USB port. This embodiment of the relay terminal has SCA-compliant architecture and a DO-178B operating system, with multiple-stream type-1 encryption.

The plurality of receivers 177 are adapted for simultaneously receiving communications signals from respectively different sources; and the router 199 in the second message processing, packet routing and control system 183 is adapted for routing the received communication signals to at least one output device connected to the vocoder 185 and/or one of the output ports of the I/O data ports 186 in accordance with a predetermined priority. The receivers 177 are respectively adapted for receiving at least two different communications signals among one or more network-specific signals, common information signals, alert signals and paging signals; and the predetermined priority is established among the one or more network-specific signals, the common information signals, the alert signals and the paging signals. In some embodiments, the receivers 177 may be implemented in a single hardware component.

At least one of the receivers 177 is adapted for receiving a given signal transmitted directly from another user terminal and another of the receivers 177 is adapted for receiving the given signal relayed by a relay terminal.

Figure 14:
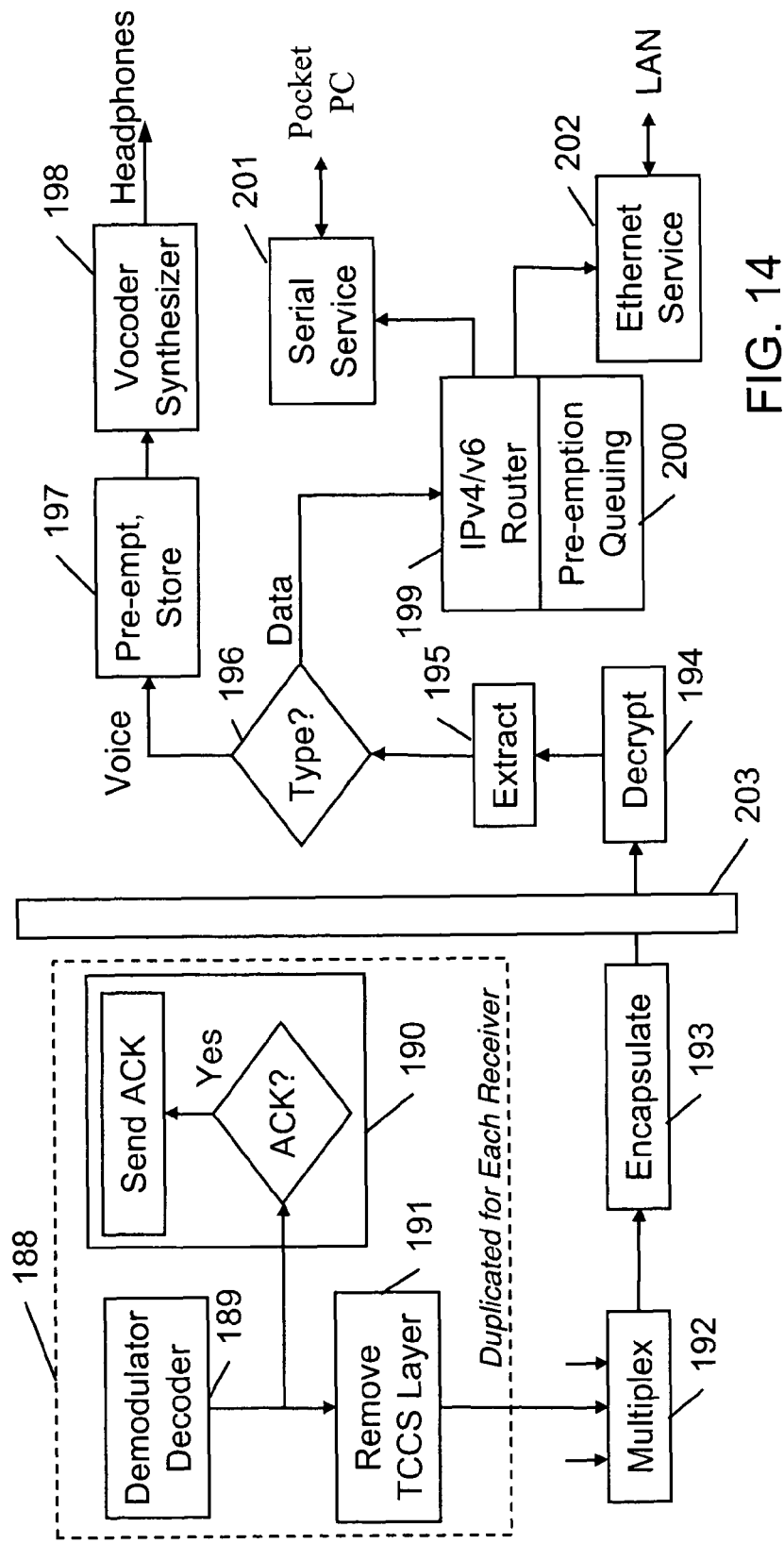
FIG. 14 is a functional block diagram showing incoming-packet routing in a preferred embodiment of the user terminal.

Referring to FIG. 14, a preferred embodiment of an incoming-packet routing system in the user terminal includes a subsystem 188 that includes a demodulator/decoder 189, a signal processor 190 that acknowledges the received signal and sends an acknowledgement message when required, and a signal processor 191 that removes the overhead layer from the received signal 13, as shown therein. The processing of the subsystem 188 is repeated for each receiver. The incoming packet routing system also includes a multiplexer 192 for multiplexing the received signals from the subsystems, an encapsulator 193, a decryptor 194, a signal extractor 195, a signal-type separator 196, a pre-empt store 197, a vocoder synthesizer 198, an IPv4/v6 router 199 with pre-emption queuing 200, a serial service port 201 and an Ethernet service port 202, which components are combined as shown in FIG. 14. A red/black barrier 203, such as firewall, is disposed between the encapsulator 193 and the decryptor 194 to prevent access to decrypted data. The incoming-packet routing system enables simultaneous reception of multiple channels and flexible message disposition.

Figure 15:
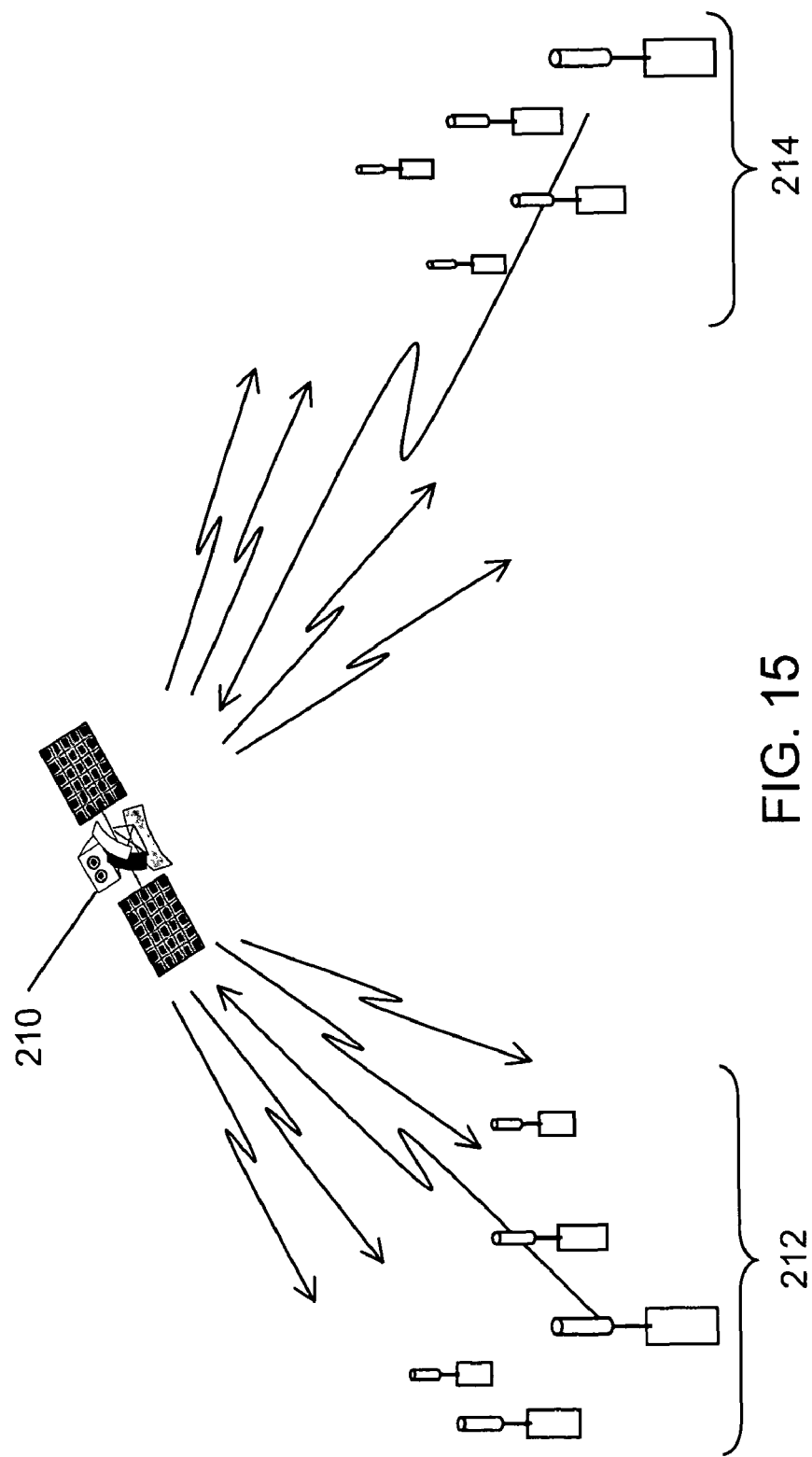
FIG. 15 illustrates a relay terminal according to the present invention in communication with a plurality of independent user-terminal networks.

FIG. 15 illustrates a relay terminal 210 according to the present invention in simultaneous communication with a plurality of independent user-terminal networks 212, 214. Each network can be anywhere within the visibility area of the relay terminal 210.

Figure 16:
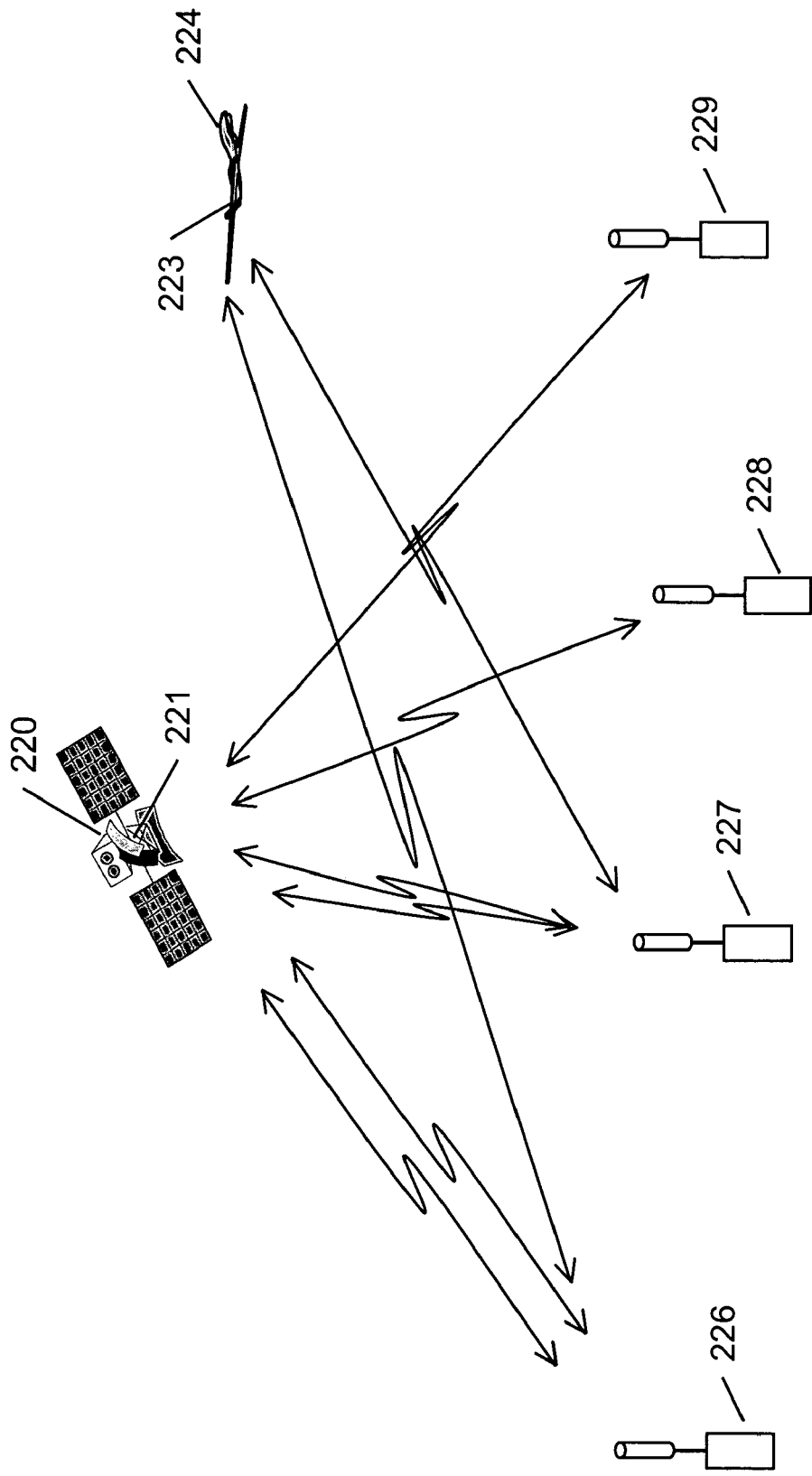
FIG. 16 is a block diagram illustrating the deployment of a plurality of relay terminals in communication with a plurality of user terminals in a preferred embodiment of a communication system according to the present invention.

Referring to FIG. 16, a preferred embodiment of a communication system according to the present invention includes at least one relay terminal 220 as described hereinabove disposed in a communication-satellite 221, at least one relay terminal 223 as described hereinabove disposed in an aircraft 224 and a plurality of user terminals 226, 227, 228, 229. Each relay terminal 220, 223 is adapted for detecting and processing the same identification codes in combination with the same stored data to determine whether immediate relaying of received communication signals to respective identified destination terminals is authorized. Each relay terminal 220, 223 is adapted for relaying communication signals from one or more of the user terminals 226, 227, 228, 229 to one or more of the user terminals 226, 227, 228, 229 in the manner described above. The multiple relay terminals 220, 223 provide diverse communication paths.

Each of the individual user terminals 226, 227, 228, 229 is adapted for simultaneously receiving both a given signal transmitted directly from another user terminal 226, 227, 228, 229 and the same given signal relayed by one or more of the relay terminals 220, 223. The system thereby provides terminal-to-terminal connectivity by one or more of the relay terminals or by line-of-sight. When the line-of-sight is blocked, the elevated relay terminals enable the communication signals to be received by the intended user terminals. The user terminals 226, 227, 228, 229 may be handheld, disposed in vehicles, network operations centers and global operations centers. The user terminal does not keep track of whether the received signal is received by line-of-sight or relayed by a relay terminal.

The communication system of FIG. 16 provides affordable robust and data exchange between relay terminals and user terminals that are on the move with respect to each other. This communication system also provides a gateway for interconnection with other communication systems.

The benefits specifically stated herein do not necessarily apply to every conceivable embodiment of the present invention. Further, such stated benefits of the present invention are only examples and should not be construed as the only benefits of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A relay terminal for relaying communication signals from originator user terminals to destination user terminals, comprising:
   a memory storing relay-authorization-and-priority data for a plurality of said originator user terminals and destination user terminals having respective identification codes;
   means for simultaneously receiving communication signals sent from a plurality of said originator terminals for relay to a plurality of said destination terminals that are identified in said received communication signals, wherein-said received signals include identification codes for said originator terminals and identification codes for said identified destination terminals;
   means for detecting said identification codes in said received communications signals;
   a computer adapted for processing said detected identification codes in combination with said stored data to determine if immediate relaying of said received communication signals to respective said identified destination terminals is authorized; and
   means for relaying said received communication signals immediately to only those of said identified destination terminals to which immediate relaying is authorized in accordance with said determination.

2. A relay terminal according to claim 1, further comprising:
   means for updating said stored relay-authorization-and-priority data immediately in response to a received control message.

3. A relay terminal according to claim 2, wherein said computer is adapted for re-determining said immediate-relay authorization in accordance with said updated stored relay-authorization-and-priority data and to preempt at least some previously authorized signal relaying in accordance with said re-determination.

4. A relay terminal according to claim 1, wherein the computer is adapted for processing said detected identification codes and said stored data in combination with geographical-position data for the relay terminal and the identified destination terminals to determine whether immediate relaying of said received communication signal to the respective identified destination terminals is authorized in accordance with the relative positions of the relay terminal and the identified destination terminals.

5. A relay terminal according to claim 4, wherein the computer is adapted for processing said detected identification codes and said stored data in combination with time-of-day data to determine whether immediate relaying of said received communication signals to respective said identified destination terminals is authorized in accordance with the time of day.

6. A relay terminal according to claim 1, further comprising:
   means for storing for delayed relay those received communication signals of which immediate relaying to respective said identified destination terminals is not authorized in accordance with said determination.

7. A relay terminal according to claim 1, further comprising means for recording data indicative of the performance of the relay terminal with respect to the timing of relaying said received communication signals in relation the time of receipt of the respective communication signals by the relay terminal.

8. A relay terminal according to claim 7, in combination with means for processing said recorded performance data to compile statistics for use in recomposing said stored relay-authorization-and-priority data.

9. A relay terminal according to claim 1, further comprising means for processing directional-position data associated with said destination terminals for defining beam paths for relaying signals to said destination terminals.

10. A relay terminal according to claim 9, further comprising:
    means for applying frequency-hopping patterns to said received communication signals for said relay of said communications signals;
    means for storing a library of algorithms and parameters for executing a plurality of frequency-hopping patterns; and
    means for selecting algorithms and parameters from said library that cause different frequency-hopping patterns to be applied for each simultaneous said receipt and relay of said communication signals.

11. A relay terminal according to claim 1, further comprising:
    means for applying frequency-hopping patterns to said received communication signals for said relay of said communications signals;
    means for storing a library of algorithms and parameters for executing a plurality of frequency-hopping patterns; and
    means for selecting algorithms and parameters from said library that cause different frequency-hopping patterns to be applied for each simultaneous said receipt and relay of said communication signals.

12. A relay terminal according to claim 11, wherein the selecting means are adapted for causing respectively different said frequency-hopping patterns to be applied to acquisition, identification and payload segments of the relayed communication signals.

13. A relay terminal according to claim 1, further comprising means for causing respectively different frequency-hopping patterns to be applied to acquisition, identification and payload segments of the relayed communication signals.

14. A relay terminal according to claim 1, wherein the relaying means are adapted for simultaneously relaying a plurality of communications signals and for applying a different frequency-hopping pattern to each said simultaneously relayed communication signal.

15. A relay terminal according to claim 1, further comprising means for processing directional-position data associated with a given said originator terminal to form a beam path for communications with the given originator terminal.

16. A relay terminal according to claim 1, further comprising
means for deriving directional-position data associated with a given said originator terminal from an acquisition segment of a burst of, a said communication signal received from a given said originator terminal; and
means for immediately defining a beam path in accordance with said derived directional-position data to enable receipt of the remaining portion of said received signal burst within the defined beam path.

17. A relay terminal according to claim 16, further comprising means for transmitting an error-corrected version of said received signal burst back to said given originator terminal within the defined beam path.

18. A relay terminal according to claim 1, further comprising
means for deriving directional-position data associated with a plurality of said originator terminals from acquisition segments of bursts of respective said communication signals simultaneously received from a plurality of said originator terminals;
means for defining respective beam paths in accordance with said derived directional-position data to enable receipt of the remaining portions said received signal bursts within the respective defined beam paths; and
means for transmitting error-corrected versions of said received signal bursts back to said plurality of originator terminals within said respective defined beam paths.

19. A relay terminal according to claim 1, wherein the receiving means are adapted for simultaneously receiving a plurality of communication signals within a plurality of distinct beam paths from a plurality of different originator terminals; and
wherein the relaying means are adapted for simultaneously relaying communications signals within a plurality of distinct beam paths to a plurality of different destination terminals.

20. A relay terminal according to claim 1, wherein the receiving means include a plurality of receivers for respectively receiving said communication signals sent from said plurality of said originator terminals.

21. A communication system, comprising:
at one said relay terminal according to claim 1 disposed in a communication-satellite; and
at least one said relay terminal according to claim 1 disposed in an aircraft;
wherein the processing means of each said relay terminal is adapted for processing the same detected identification codes in combination with the same said stored data to determine whether immediate relaying of said received communication signals to respective said identified destination terminals is authorized.

22. A relay terminal for relaying communication signals from an originator user terminal to identified destination user terminals, comprising:
a memory storing relay-authorization-and-priority data for a plurality of said originator user terminals and destination user terminals having respective identification codes;
means for receiving a communication signal for relay to selected said destination terminals, wherein said received signal includes identification codes for said identified destination terminals;
means for detecting said identification codes in said received communications signal;
a computer adapted for processing said detected identification codes and said stored data in combination with time-of-day data and geographical-position data for the relay terminal and the identified destination terminals to determine whether immediate relaying of said received communication signal to respective identified destination terminals is authorized in accordance with the time of day and the relative positions of the relay terminal and the identified destination terminals; and
means for relaying said received communication signal to the identified destination terminal at times when said relaying is authorized in accordance with said determination.

23. A relay terminal according to claim 22, further comprising:
means for storing for delayed relay those received communication signals of which immediate relaying to respective said identified destination terminals is not authorized in accordance with said determination in accordance with the time of day.

24. A relay terminal for relaying communication signals from originator user terminals to identified destination user terminals, comprising:
means for receiving a given communication signal sent from a given said originator terminal for relay to one or more selected said destination terminals;
means for detecting the direction of arrival of the received given communication signal by processing portions of the given signal received prior to detecting identification codes in the received given signal;
means for deriving directional-position data associated with the given originator terminal from said detected direction of arrival of the given received communication signal; and
a computer adapted for processing the derived directional-position data associated with the given originator terminal to define a beam path for communications with the given originator terminal.

25. A relay terminal for relaying communication signals from originator user terminals to identified destination user terminals, comprising:
means for receiving a given communication signal sent from a given said originator terminal for relay to one or more selected said destination terminals;
means for deriving directional-position data associated with the given originator terminal from an acquisition segment of a burst of said received given communication signal; and means for immediately defining a beam path in accordance with said derived directional-position data to enable receipt of the remaining portions of said received signal burst within the defined beam path.

26. A relay terminal according to claim 25, further comprising means for transmitting an error-corrected version of said received signal burst back to said given originator terminal within the defined beam path.

27. A relay terminal for relaying communication signals from originator user terminals to identified destination user terminals, comprising:
  means for simultaneously receiving communication signals sent from a plurality of said originator terminals for relay to a plurality of selected said destination terminals;
  means for deriving directional-position data associated with a plurality of said originator terminals from acquisition segments of bursts of respective said communication signals simultaneously received from a plurality of said originator terminals;
  means for defining respective beam paths in accordance with said derived directional-position data to enable receipt of the remaining segments of said received signal bursts within the respective defined beam paths; and
  means for transmitting error-corrected versions of said received signal bursts back to said plurality of originator terminals within said respective defined beam paths.

28. A relay terminal for relaying communication signals from originator user terminals to identified destination user terminals, comprising:
  means for applying frequency-hopping patterns to said received communication signals for said relay of said communications signals;
  means for storing a library of algorithms and parameters for executing a plurality of frequency-hopping patterns; and
  means for selecting algorithms and parameters from said library that cause different frequency-hopping patterns to be applied for each simultaneous said receipt and relay of said communication signals;
  wherein the selecting means are adapted for causing respectively different said frequency-hopping patterns to be applied to acquisition, identification and payload segments of said relayed communication signals.

29. A relay terminal, for relaying communication signals from originator user terminals to destination user terminals, comprising:
  means for receiving communication signals sent from a plurality of said originator user terminals for relay to a plurality of destination user terminals that are identified in said received communication signals, wherein said received signals include identification codes for said originator terminals and identification codes for said identified destination terminals;
  means for detecting the directions of arrival of given said received communication signals by processing portions of the given signals received prior to detecting identification codes in the received given signals;
  means for deriving directional-position data from said detected directions of arrival associated with a said user terminal from which a said given communication signal is received; and
  a computer adapted for processing the derived directional-position data associated with the given originator terminal to define a beam path for communications with the given originator terminal in accordance with said derived directional-position data for use when receiving and transmitting communication signals from and to a said user terminal for which the direction of arrival of said received communication signal is detected.

30. A relay terminal according to claim 1, wherein multiple tables of the relay-authorization-and-priority data are stored in the memory for processing with the identification codes detected in the received communication signals at different times and/or different locations of the relay terminal.

31. A nontransitory computer readable storage medium for use with a computer in a relay terminal that is adapted for relaying communication signals from originator user terminals to destination user terminals, wherein the relay terminal comprises: a memory storing relay-authorization-and-priority data for a plurality of said originator user terminals and destination user terminals having respective identification codes; means for simultaneously receiving communication signals sent from a plurality of said originator terminals for relay to a plurality of said destination terminals that are identified in said received communication signals, wherein said received signals include identification codes for said originator terminals and identification codes for said identified destination terminals; means for detecting said identification codes in said received communications signals; a computer for processing said detected identification codes in combination with said stored data to determine if immediate relaying of said received communication signals to respective said identified destination terminals is authorized; and means for relaying said received communication signals immediately to only those of said identified destination terminals to which immediate relaying is authorized in accordance with said determination;
  wherein the computer readable storage medium contains computer executable program instructions for causing the computer to perform the step of:
  processing said detected identification codes in combination with said stored data to determine if immediate relaying of said received communication signals to respective said identified destination terminals is authorized.

32. A nontransitory computer readable storage medium for use with a computer in a relay terminal that is adapted for relaying communication signals from originator user terminals to destination user terminals, wherein the relay terminal comprises: a memory storing relay-authorization-and-priority data for a plurality of said originator user terminals and destination user terminals having respective identification codes; means for receiving a communication signal for relay to selected said destination terminals, wherein said received signal includes identification codes for said identified destination terminals; means for detecting said identification codes in said received communications signal; a computer adapted for processing said detected identification codes and said stored data in combination with time-of-day data and geographical-position data for the relay terminal and the identified destination terminals to determine whether immediate relaying of said received communication signal to respective identified destination terminals is authorized in accordance with the time of day and the relative positions of the relay terminal and the identified destination terminals; and means for relaying said received communication signal to the identified destination terminal at times when said relaying is authorized in accordance with said determination;
   wherein the computer readable storage medium contains computer executable program instructions for causing the computer to perform the step of:
   processing said detected identification codes and said stored data in combination with time-of-day data and geographical-position data for the relay terminal and the identified destination terminals to determine whether immediate relaying of said received communication, signal to respective identified destination terminals is authorized in accordance with the time of day and the relative positions of the relay terminal and the identified destination terminals.

* * * * *

UNITED STATES PATENT AND TRADEMARK OFFICE
CERTIFICATE OF CORRECTION

| | | |
|---|---|---|
| PATENT NO. | : 7,974,227 B1 | Page 1 of 1 |
| APPLICATION NO. | : 10/725873 | |
| DATED | : July 5, 2011 | |
| INVENTOR(S) | : Thomas Stanley Seay | |

It is certified that error appears in the above-identified patent and that said Letters Patent is hereby corrected as shown below:

Column 9, line 5, "NAT;" should be --wi--
Column 11, line 20, "to" should be omitted
Column 17, line 48, the "," should be omitted
Column 20, line 3, the "," should be omitted Signed and Sealed this
Eighteenth Day of October, 2011

David J. Kappos
*Director of the United States Patent and Trademark Office*